United States Patent [19]

Fujie et al.

[11] Patent Number: 4,770,513
[45] Date of Patent: Sep. 13, 1988

[54] PROJECTION LENS

[75] Inventors: Daijiro Fujie, Sagamihara; Yoichi Umegaki, Mitaka, both of Japan

[73] Assignee: Nippon Kogaku K. K., Tokyo, Japan

[21] Appl. No.: 924,441

[22] Filed: Oct. 29, 1986

[30] Foreign Application Priority Data

Nov. 1, 1985 [JP] Japan .................................. 60-246044
Sep. 29, 1986 [JP] Japan .................................. 61-230965

[51] Int. Cl.$^4$ ...................... G02B 13/18; G02B 27/18; G02B 9/34
[52] U.S. Cl. .................................... 350/432; 350/412; 350/471
[58] Field of Search ...................... 350/432, 412, 471

[56] References Cited

U.S. PATENT DOCUMENTS 4,548,480 10/1985 Yamamoto et al. ................ 350/432
4,620,773 11/1986 Fukuda ................................ 350/412

Primary Examiner—John K. Corbin
Assistant Examiner—Rebecca D. Gass
Attorney, Agent, or Firm—Shapiro and Shapiro

[57] ABSTRACT

A projection lens for projecting an image onto a screen includes, in succession from the screen side, a first lens component having a positive refractive power, a second lens component having a positive refractive power and whose both lens surfaces are convex surfaces, a third lens component of meniscus shape having its convex surface facing the screen side, and a fourth lens component having a negative refractive power and whose surface which is adjacent to the screen is a concave surface.

17 Claims, 5 Drawing Sheets

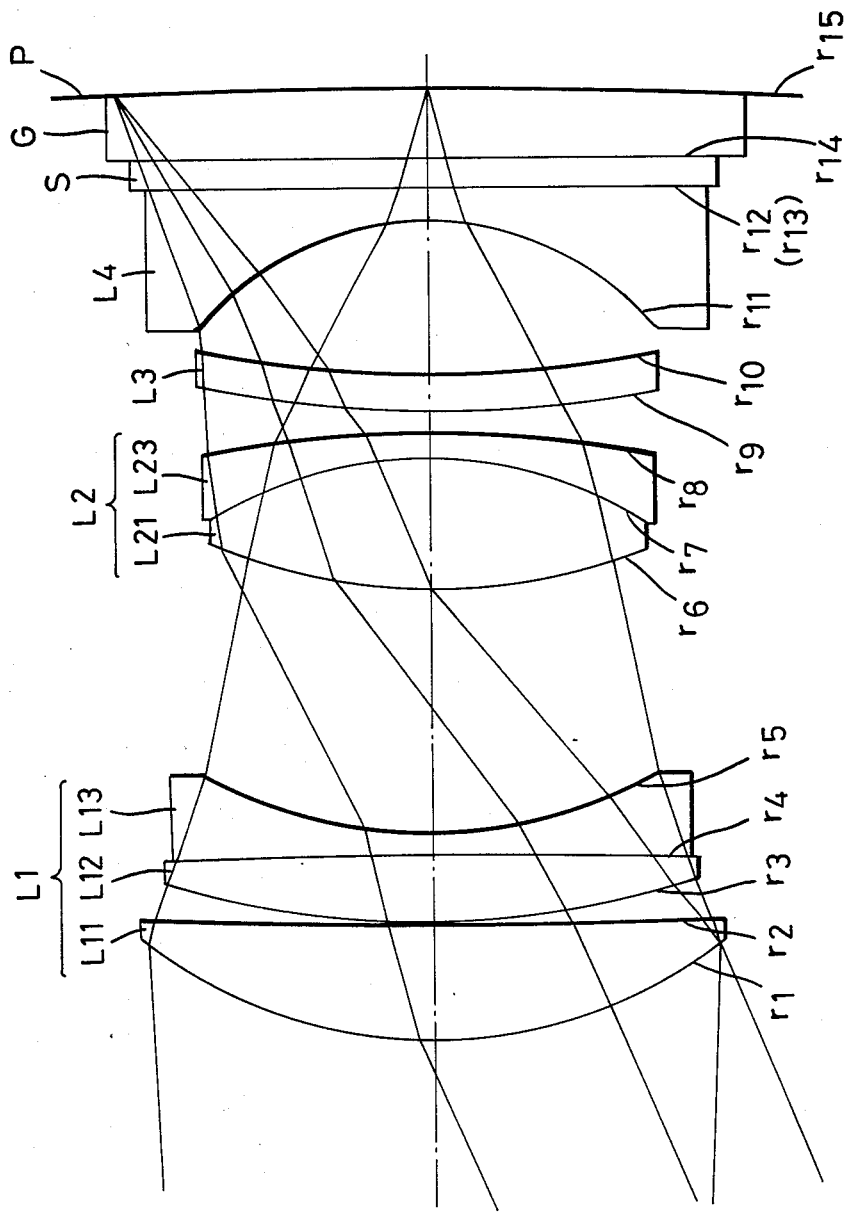

PROJECTION LENS

BACKGROUND OF THE INVENTION

1. Field of the Invention

This invention relates to a projection lens, and in particular to a projection lens for use in a video projector for projecting a CRT image and obtaining a large picture plane.

2. Related Background Art

In recent years, so-called video projectors are gradually being popularized as a method for obtaining television reproduced images of large picture plane, and in securing the quality of the reproduced images, the performance of a projection lens bears an important role.

In order to obtain bright projected images, a bright projection lens of a great aperture is required and at the same time, in order to shorten the distance from the CRT image plane to the screen and make the depth of the cabinet as a projection apparatus compact, it is required to make the angle of view of the projection lens wide. Generally, in a video projector, three projection lenses corresponding to CRTs of three colors, B(blue), G(green) and R(red), and various projection lenses using aspherical plastic lenses have been devised to achieve the above-described high-degree specification while making the lenses compact and light in weight and reducing the cost of manufacture.

The projection lens disclosed, for example, in U.S. Pat. No. 4,548,480 comprises three lenses as shown in FIG. 1 of the accompanying drawings. That is, this projection lens comprises, in succession from the screen side (the left side as viewed in FIG. 1), a first lens component G1 having a positive refractive power, a second lens component G2 of biconvex shape having a positive refractive power, and a third lens component G3 having a negative refractive power and having its surface of sharper curvature facing the screen side. Aspherical surfaces are used in the first lens component G1 and the third lens component G3 to thereby correct the imaging performance well, but with regard to distortion, as shown in FIG. 2 of the accompanying drawings, distortion is deflected at the medium angle of view in the positive direction and deflected at the outermost marginal portion in the negative direction, and bending of so-called high-order aberrations is created. Such a distortion characteristic is considered to be attributable chiefly to the structure of the third lens component G3. That is, the third lens component is disposed at a position nearest the CRT and has the function of correcting chiefly curvature of image field as a so-called field flattener, but a projection lens having a great aperture and a wide angle of view is of a shape in which the curvature of the surface thereof which is adjacent to the screen becomes gentler away from the center of the optic axis to prevent deterioration of off-axis coma. As a result, the action of the negative lens for deflecting distortion in the positive direction becomes weaker in the marginal portion thereof, and this presents itself as the bending of distortion.

Such bending of distortion presents itself as a more remarkable tendency in an arrangement wherein the spacing $D_2$ between the second lens component and the third lens component is short, because the refractive power of each lens component must unavoidably be made strong.

Specifically, this corresponds to an arrangement in which the spacing $D_2$ between the second lens component and the third lens component must be shortened to secure a back focal length, such as (1) a case where silicon gel is enclosed for the purposes of preventing any reduction in contrast by the reflection on the third lens component and the surface of the face plate of the CRT and improving the CRT characteristic by liquid cooling, (2) a case where a mirror inclined at approximately 45° is installed between the first lens component and the second lens component to achieve a compact arrangement, or (3) a case where enlargement of high magnification in which the enlargement magnification exceeds ten times.

Particularly, where high-order bending is present in distortion, bobbin type distortion is combined with barrel type distortion, and this is not preferable.

Moreover, the following problem arises in a projection lens for a video projector. In a popular video projector, as shown in FIG. 3, of the accompanying drawings, the images by G-CRT, B-CRT and R-CRT corresponding to three colors, G(green), B(blue) and R(Red) are compositely projected onto a screen S by respective projection lenses $L_B$, $L_G$ and $L_R$, whereby an orthochromatic image is obtained. At this time, from the limitations in the arrangement of the projection lenses, B-CRT and R-CRT are projected from directions each inclined by $\theta$ with respect to the middle G-CRT. To obtain an image clear-out up to the marginal portion of the picture plane, as is well known, the projection lenses $L_B$ and $L_R$ for B-CRT and R-CRT and the CRTs B-CRT and R-CRT may be inclined with respect to the lens $L_G$ and G-CRT, in accordance with the principle of swing and tilting. In this case, the images provided by the inclined projection lenses $L_B$ and $L_R$ change from a rectangular shape to a trapezoidal shape, as shown in FIG. 4A of the accompanying drawings. So, by partly changing and correcting the scanning magnifications of B-CRT and R-CRT, the shapes of the projected images by B-CRT, G-CRT and R-CRT are accurately superposed one upon another on the screen and an image of natural color tones.

However, where at this time, remarkable high-order bending is present in the distortion of the projection lenses as shown in FIG. 2, the image indicated by solid line in FIG. 4A becomes the image indicated by solid line in FIG. 4B of the accompanying drawings, and the correction on the CRTs becomes difficult. As a result, color misregistration has occurred in the marginal portion of the picture plane and has presented itself as a reduction in quality of image.

SUMMARY OF THE INVENTION

It is an object of the present invention to provide a projection lens of great aperture and with angle of view for a video projector in which high-order distortion has been corrected well.

The projection lens according to the present invention is a projection lens for projecting an image on a CRT as the object surface onto a screen and comprises, in succession from the screen side, a first lens component $L_1$ having a positive refractive power, a second lens component $L_2$ having a positive refractive power and whose both lens surfaces are convex surfaces, a third lens component $L_3$ of meniscus shape having its convex surface facing the screen side, and a fourth lens component $L_4$ having a negative refractive power and whose surface which is adjacent to the screen is a concave surface.

By such a basic construction, the first lens component has the function of correcting spherical aberration and off-axis coma, the second lens component has the function of correcting spherical aberration and coma which cannot completely be corrected by the first lens component, the third lens component has the function of correcting distortion well, and the fourth lens component has the function of correcting Petzval sum, i.e., curvature of image field and astigmatism, as a field flattener.

To fully perform such correcting functions, at least one of the lens surfaces of each of the first, third and fourth lens components may preferably be made aspherical. Also, the lenses having aspherical surfaces may be made of plastic as a lens material, whereby a great reduction in cost can be expected.

BRIEF DESCRIPTION OF THE DRAWINGS

FIG. 11 shows the lens construction of seventh and eighth embodiments of the present invention.

DESCRIPTION OF THE PREFERRED EMBODIMENTS

Figure 1:
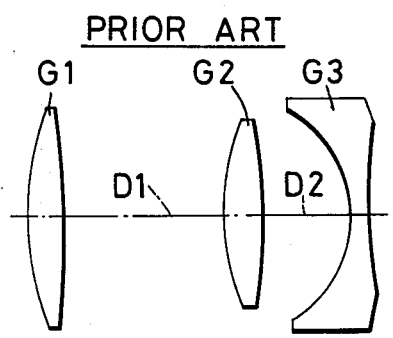
FIG. 1 shows the lens construction of an example of a projection lens according to the prior art.
Figure 2:
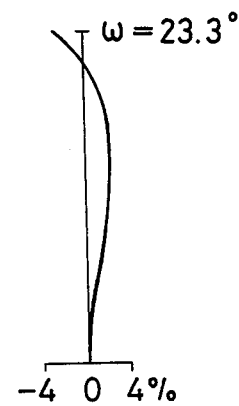
FIG. 2 shows the distortion in the prior-art projection lens shown in FIG. 1.
Figure 3:
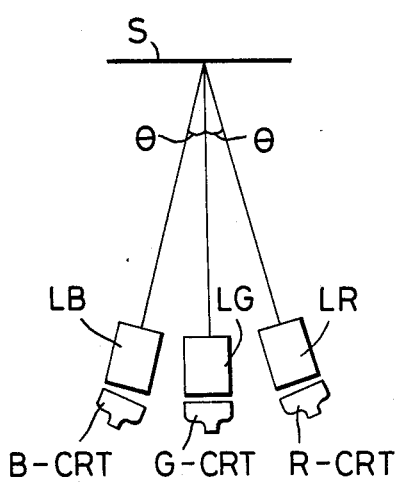
FIG. 3 illustrates the arrangement of a three-tube type video projector.
Figure 4A:
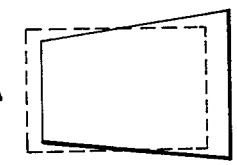
FIGS. 4A and 4B illustrate the manner in which a projected image is deformed by swing and tilting.
Figure 4B:
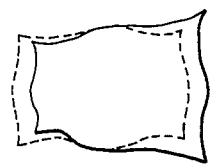

In the present invention, the feature of a third lens component in first to sixth embodiments and the feature of third lens component $L_3$ in seventh and eighth embodiment differ from each other. In the first to sixth embodiments, to correct distortion well, it is desirable to satisfy the following condition:

$$-20 < \frac{r_B + r_A}{r_B - r_A} < -1, \quad (1)$$

where $r_A$ is the radius of curvature of that surface of the third lens component which is nearest the screen, and $r_B$ is the radius of curvature of that surface of the third lens component which is nearest the CRT. That surface of the third lens component $L_3$ which is adjacent to the CRT is of a meniscus shape having a strong negative refractive power and the refractive power thereof is weak negative.

The condition (1) above means that the third lens component is of a meniscus shape having its convex surface facing the screen, and if the lower limit of this condition is exceeded, correction of distortion will become excessive, and if the upper limit of this condition is exceeded, distortion will become under-corrected. Also, if the lower limit of this condition is exceeded, outer coma will become so great that a wide angle of view cannot be achieved. If the upper limit of this condition is exceeded, spherical aberration will become over-corrected and flare will increase.

To well correct distortion, including the bending by high-order aberrations without causing aggravation of the other aberrations, it is desirable to make that surface of the third lens component which is adjacent to the CRT aspherical. In addition, it is desirable that the aspherical shape of this third lens component be of a construction which satisfies the following formula:

$$0 < \frac{AS - S}{P_B} < 10, \quad (2)$$

where

AS-S: the difference in the direction of the optic axis between the aspherical surface in the outermost marginal portion of the effective diameter and the reference spherical surface having a predetermined vertical radius of curvature $P_B$: the vertical refractive power of the surface adjacent to the CRT which has been normalized by the focal length of the entire system That is, $$P_B = \frac{n-1}{r_B} \times f,$$

where n and f are defined as follows:
n: the refractive index of the third lens component
f: the focal length of the entire system.

If the aspherical shape of the third lens component departs from the lower limit of the formula (2) above, the correction effect of high-order distortion will decrease, and if the upper limit of the formula (2) is exceeded, correction of distortion will become excessive and at the same time, outer coma will become great with respect to a light beam of great image height, and cannot be corrected even by the effect of the aspherical surface of a fourth lens component.

Further, to better correct the various aberrations including distortion, it is desirable to satisfy the following condition (3) with respect to the focal length $f_3$ of the third lens component:

$$-20 < f_3/f < -2.0 \quad (3).$$

Where the value of the focal length $f_3$ of the third lens component exceeds the lower limit of the formula (3) and the refractive power as a negative lens component becomes weak, the refractive power of the fourth lens component must be made great in order to keep the Petzval sum of the entire system good and correct curvature of image field well, and coma will be aggravated with respect to a light beam of great image height, or the bending of distortion will become actualized by the action of the aspherical surface of the fourth lens component which is adjacent to the screen. If the upper limit of the formula (3) is exceeded, the negative refractive power of the third lens component will become too strong and the positive refractive power of a second lens component will become strong to keep the balance of the entire system, and correction of spherical aberration will be deficient.

Further, to well correct distortion including high-order bending, it is desirable to construct the arrangement of the third lens component within the range of the following condition (4):

$$1.0 < D_6/D_4 < 6.0 \quad (4),$$

where
$D_4$: the interval on the optic axis between the second lens component and the third lens component
$D_6$: the interval on the optic axis between the third lens component and the fourth lens component Exceeding the upper limit of the condition (4) means that the third lens component comes close to the second lens component, and in such an arrangement, the height from the optic axis at which the off-axis light beam passes through the third lens component is not so far from the height from the optic axis at which the on-axis light beams passes through the third lens component and therefore, the effect of correcting only the off-axis distortion without aggravating the performance of the off-axis light beam.

On the other hand, if the lower limit of the condition (4) is exceeded and the third lens comes close to the fourth lens component, there will be the limitation that the edge thickness of the lens becomes too small to secure the effective diameter of the lens and thus, it will be difficult to maintain an effective wide angle of view.

In contrast with the first to sixth embodiments, the seventh and eighth embodiments satisfy the following condition:

$$-0.05 < \frac{r_B - r_A}{r_B + r_A} < 1 \quad (5)$$

To make a projection lens bright, the third lens component $L_3$ is of a meniscus shape having its concave surface facing the CRT and the refractive power thereof is from weak negative to weak positive.

The condition (5) means that the third lens component $L_3$ is of a meniscus shape having it convex surface facing the screen, and if the lower limit of this condition is exceeded, correction of distortion will become excessive, and if the upper limit of this condition is exceeded, distortion will become under-corrected. Also, if the lower limit of this condition is exceeded, outer coma will become great and a wide angle of view cannot be achieved. If the upper limit of this condition is exceeded, spherical aberration will become over-corrected and flare will increase.

To well correct coma and distortion, including the bending by high-order aberrations, without causing the aggravation of the other aberrations, it is desirable to make that surface of the third lens component $L_3$ which is adjacent to the CRT aspherical. In addition, it is desirable that the aspherical shape of this third lens component be made such that the refractive power is weak in the marginal portion, that is, the curvature is weaker and the negative refractive power is weaker in the marginal portion than in the central portion, and that the seventh and eighth embodiments be of such a construction which satifies the following formula:

$$-10 < \frac{AS - S}{P_B} < 0 \quad (6)$$

If the aspherical shape of the third lens component $L_3$ departs from the lower limit of the formula (6) above, the correction effect of high-order distortion will decrease, and if the upper limit of the formula (6) is exceeded, correction of distortion will become excessive and at the same time, outer coma will become great with respect to a light beam of great image height and cannot be corrected even by the effect of the aspherical surface of the fourth lens component.

Further, to better correct the various aberrations including distortion, it is desirable for the seventh and eighth embodiments to satisfy the following condition (7) with respect to the focal length $f_3$ of the third lens component:

$$-0.05 < f/f_3 < 0.3 \quad (7)$$

If the value of focal length $f_3$ of the third lens component $L_3$ exceeds the upper limit of the formula (7) and the refractive power as a positive lens component is strong, the refractive power of the fourth lens component $L_4$ must be made strong to keep the Petzval sum of the entire system good and correct curvature of image field well, and coma will be aggravated with respect to a light beam of great image height or the bending of distortion will become actualized by the action of the aspherical surface of the fourth lens component which is adjacent to the screen. If the lower limit of the formula (7) is exceeded, the negative refractive power of the third lens component $L_3$ will become too strong and the positive refractive power of the second lens component $L_2$ will become strong to keep the balance of the entire system and correction of spherical aberration will be deficient.

Further, to well correct distortion including high-order bending, the arrangement of the third lens component in the seventh and eighth embodiments is made so as to satisfy the formula (4) above.

As previously described, it is advantageous in respect of both aberration correction and cost of manufacture that a lens made of plastic having at least one surface thereof made aspherical is included as a constituent among the first, third and fourth lens components. However, to minimize the deterioration of the performance resulting from any variation in refractive index by temperature which is one of the drawbacks of plastic lenses, it is desirable that the second lens component which is strongest in refractive power of the entire system be constituted by a glass lens. Thereby, it becomes possible to reduce the fluctuation of the image point position resulting from any variation in refractive index by temperature. In the first to eighth embodiments, it is therefore desirable to set the refractive power of the third lens component to the range of the following formula (8):

$$0.8 < f_2/f < 1.3 \quad (8),$$

$f_2$: focal length of the second lens component

If the focal length of the second lens component exceeds the upper limit of the formula (8), the refractive power of the first lens component must be made strong and correction of off-axis coma will become difficult and at the same time, if the first lens component is constituted by only a plastic lens, deterioration of the performance resulting from any temperature range will become great. If the lower limit of the formula (8) is exceeded, spherical aberration will become under-corrected.

Further, in the first to six embodiments, it is preferable to satisfy the following formula (9):

$$0.8 < f_2/f < 1.1 \quad (9)$$

Furthermore, in the seventh and eighth embodiments, it is preferable to satisfy the following equation (10):

$$0.9 < f_2/f < 1.3 \quad (10)$$

Figure 5:
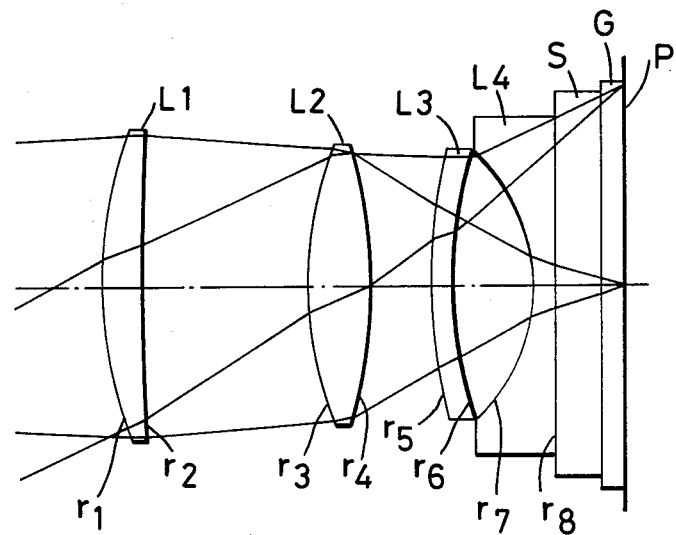
FIG. 5 shows the lens construction of a first embodiment of the present invention.

FIG. 5 shows the construction of a lens according to a first embodiment of the present invention. In FIG. 5 are shown the center of the picture plane and the optical path of a light beam reading a maximum image height (y=63.5 mm).

In the projection lens of the present embodiment, there are disposed, in succession from the screen side, a first lens $L_1$ having a positive refractive power, a second lens $L_2$ of biconvex shape having a positive refractive power, a third lens $L_3$ of meniscus shape having its concave surface facing the CRT, a fourth lens $L_4$ having a negative refractive power and having its concave surface of sharper curvature facing the screen, silicon rubber S which can optically be treated substantially as a parallel flat plate for the purpose of compling the lenses and the CRT, and a fluorescent surface P as the object surface disposed substantially through the CRT front glass G of the parallel flat surface.

Those surfaces $r_1$ and $r_7$ of the first lens $L_1$ and the fourth lens $L_4$ which are adjacent to the screen and that surface $r_6$ of the third lens $L_3$ which is adjacent to the CRT are aspherical. Also, the first lens $L_1$, the third lens $L_3$ and the fourth lens $L_4$ having aspherical surfaces are formed of an acrylic lens material and only the second lens is formed of a glass material.

When this projection lens is actually used, light rays are condensed from the fluorescent surface P as the object surface onto the screen, not shown, but along the technique of lens design based on the principle of reverse travel of light rays, description will hereinafter be made on the assumption that light rays enter from the screen side and are condensed on the fluorscent surface P.

The function of each lens can be easily explained by the light ray reading the center of the object surface P shown in FIG. 5 and the maximum image height position. That is, the on-axis light beam reading the center of the object surface enters the first lens fully over the effective diameter thereof determined by F-number, but when it enters the third lens $L_3$ and the fourth lens $L_4$ under the refracting actions of the first lens $L_1$ and the second lens $L_2$, it is converged into a thin light beam of about ½ to about ¼ of the effective diameter of the first lens $L_1$. On the other hand, in the first and second lenses $L_1$ and $L_2$, the off-axis light beam obliquely enters within the range of the effective diameter determined by the on-axis light beam and is subjected to the refracting action, and in the third and fourth lenses $L_3$ and $L_4$, the incidence height becomes gradually greater. Accordingly, toward the side of the lens system which is adjacent to the CRT, the separation of the optical path through which the on-axis light beam passes and the optical path through which the off-axis light beam passes becomes pronounced.

From what has been described above, it is seen that correction of the aberration of the on-axis light beam, i.e., spherical aberration, should effectively be done in the first and second lenses $L_1$ and $L_2$ and that with regard to the aberrations of the off-axis light beam, i.e., astigmatism, curvature of image field, coma and distoration, the correcting functions of the third lens $L_3$ and the fourth lens $L_4$ in addition to the actions of the first and second lenses $L_1$ and $L_2$ are important. That is, in the first lens $L_1$, to correct spherical aberration and off-axis coma at a time in a well balanced manner, the correcting effect can be enhanced by making the first surface aspherical as a meniscus positive lens having its convex surface facing the screen side.

The second lens $L_2$ has the greatest positive refractive power as is apparent from FIG. 5, and is constituted by a glass lens to prevent any fluctuation of the image point position resulting from any variation in refractive index of the material by temperature. Also, the lens shape is made into a biconvex shape with the aberration balance between the on-axis light beam and the off-axis light beam taken into account.

Before the third lens $L_3$ is described, the function of the fourth lens $L_4$ will be described. The fourth lens $L_4$ is nearest the CRT image and is most remarkable in separation of the light beam due to the difference in image height and can therefore correct the aberrations of the off-axis light beam, particularly, curvature of image field without adversely affecting the on-axis light beam and thus, functions as a field flatterner. Further, to correct curvature of image field more effectively, that surface of the fourth lens which is adjacent to the screen is made aspherical to thereby correct the off-axis coma occurring when the center curvature of said surface is made sharper.

The third lens $L_3$ corrects primarily the high-order distortion resulting from making that surface of the fourth lens $L_4$ which is adjacent to the screen aspherical. That is, as previously described, in order to prevent deterioration of off-axis coma, the fourth lens is of a shape in which the curvature of the surface thereof which is adjacent to the screen becomes gentler away from the center of the optic axis and therefore, it can be well corrected by the diverging surface of the third lens which is convex toward the screen that the diverging action of deflecting distortion in the positive direction becomes weaker in the marginal portion and presents itself as the bending of distortion. Further, the third lens also has the function of well correcting the various aberrations in the entire system.

The numerical data of the first embodiment are shown in Table 1 below.

In Table 1, $r_1, r_2, r_3, \ldots$ represent the radii of curvature of the surfaces of the successive lenses from the screen side, $d_1, d_2, d_3, \ldots$ represent the center thicknesses and spacings of the respective lenses, $n_1, n_2, n_3, \ldots$ represent the refractive indices of the respective lenses for e-line ($\lambda=546.1$ nm), and $\nu_1, \nu_2, \nu_3, \ldots$ represent the abbe number of the respective lenses. Also, $f_1, f_2, f_3, \ldots$ represent the focal lengths of the respective lenses, and f represents the focal length of the entire system. The aspherical shape is a rotation:symmetrical aspherical shape represented by $$X = \frac{CP}{1 + \sqrt{1 - KC^2 P^2}} +$$

$$C_2 P^2 + C_4 P^4 + C_6 P^6 + C_8 P^8 + C_{10} P^{10},$$

where in rectangular coordinates having the direction of the optic axis as the X-axis, C is the vertex curvature, K is the cone constant, $C_2, C_4, C_6, C_8$ and $C_{10}$ are high-order constants, and $$P = \sqrt{Y^2 + Z^2},$$

and the values of these coefficients of asphericity are also shown in Table 1. (These also hold true of the following embodiments.)

TABLE 1

(First Embodiment)

f = 106.5  Aperture ratio 1:10
Projection magnification −7.95  Half angle of view 27.9°

| | | | |
|---|---|---|---|
| *$r_1$ 108.818 | $d_1$ 13.0 | $n_1$ 1.49397 | $L_1$ |
| $r_2$ 707.141 | $d_2$ 58.0 | | |
| $r_3$ 116.671 | $d_3$ 20.0 | $n_2$ 1.62041 | $L_2$ |
| $r_4$ −166.300 | $d_4$ 23.0 | | |
| $r_5$ 231.147 | $d_5$ 6.5 | $n_3$ 1.49397 | $L_3$ |
| *$r_6$ 164.907 | $d_6$ 30.37 | | |
| *$r_7$ −47.143 | $d_7$ 5.0 | $n_4$ 1.49397 | $L_4$ |
| $r_8$ ∞ | | | |
| $r_9$ ∞ | $d_8$ 16.0 | $n_5$ 1.41000 | S |
| $r_{10}$ ∞ | $d_9$ 7.0 | $n_6$ 1.51953 | G |

| | $r_1$ ($L_1$) | $r_6$ ($L_3$) | $r_7$ ($L_4$) |
|---|---|---|---|
| K | 1.0 | 1.0 | 0.0 |
| $C_2$ | 0.0 | 0.0 | 0.0 |
| $C_4$ | −0.2232 × $10^{-6}$ | 0.6576 × $10^{-6}$ | −0.1910 × $10^{-6}$ |
| $C_6$ | −0.8053 × $10^{-10}$ | −0.1742 × $10^{-9}$ | −0.8626 × $10^{-9}$ |
| $C_8$ | 0.2548 × $10^{-13}$ | 0.7448 × $10^{-13}$ | 0.2777 × $10^{-12}$ |
| $C_{10}$ | −0.6589 × $10^{-17}$ | 0.3381 × $10^{-17}$ | −0.6437 × $10^{-16}$ |

*Aspherical surfaces

Figure 6:
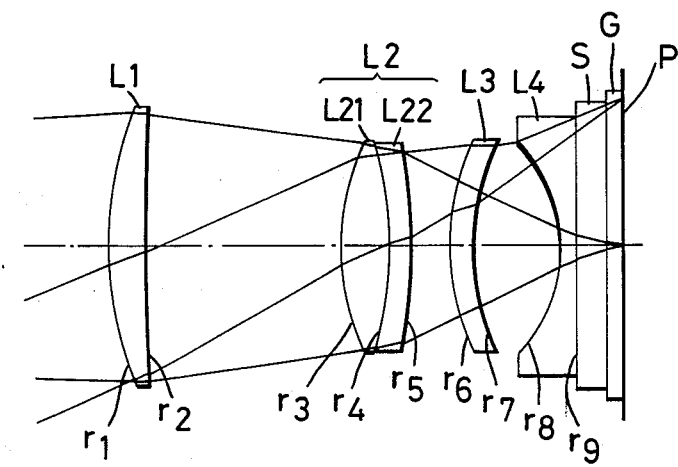
FIG. 6 shows the lens construction of a second embodiment of the present invention.

FIG. 6 shows the lens construction of the second embodiment of the present invention.

The projection lens according to the second embodiment is basically similar in arrangement to that according to the first embodiment, but in this projection lens, the second lens $L_2$ of the strongest refractive power is provided by a cemented achromatic lens consisting of a biconvex positive lens $L_{21}$ and a negative meniscus lens $L_{22}$, thereby improving the on-axis chromatic aberration of the entire system.

The numerical data of the second embodiment are shown in Table 2 below.

TABLE 2

(Second Embodiment)

f = 149.4  Aperture ratio 1:1.20
Projection magnification −10.65  Half angle of view 22.5°

| | | | |
|---|---|---|---|
| *$r_1$ 147.614 | $d_1$ 17.5 | $n_1$ 1.49311 | $L_1$ |
| $r_2$ 1238.391 | $d_2$ 100.0 | | |
| $r_3$ 139.320 | $d_3$ 24.0 | $n_2$ 1.62287 | $L_{21}$ |
| $r_4$ −139.320 | $d_4$ 6.0 | $n_3$ 1.62410 | $L_{22}$ |
| $r_5$ −331.819 | $d_5$ 22.3 | | |
| $r_6$ 116.134 | $d_6$ 9.0 | $n_4$ 1.49311 | $L_3$ |
| *$r_7$ 102.423 | $d_7$ 44.0 | | |
| *$r_8$ −64.983 | $d_8$ 7.0 | $n_5$ 1.49311 | $L_4$ |
| $r_9$ ∞ | | | |
| $r_{10}$ ∞ | $d_9$ 15.0 | $n_6$ 1.41000 | $L_5$ |
| $r_{11}$ ∞ | $d_{10}$ 7.1 | $n_7$ 1.51872 | $L_6$ |

| | $r_1$ ($L_1$) | $r_7$ ($L_3$) | $r_8$ ($L_4$) |
|---|---|---|---|
| K | 1.0 | 1.0 | 0.0 |
| $C_2$ | 0.0 | 0.0 | 0.0 |
| $C_4$ | −0.5915 × $10^{-7}$ | 0.2645 × $10^{-6}$ | 0.3326 × $10^{-6}$ |
| $C_6$ | −0.9904 × $10^{-11}$ | −0.1476 × $10^{-9}$ | −0.7211 × $10^{-9}$ |
| $C_8$ | 0.1740 × $10^{-14}$ | 0.7985 × $10^{-13}$ | 0.2712 × $10^{-12}$ |
| $C_{10}$ | −0.2000 × $10^{-18}$ | −0.1731 × $10^{-16}$ | −0.4693 × $10^{-16}$ |

*Aspherical surfaces

Figure 7:
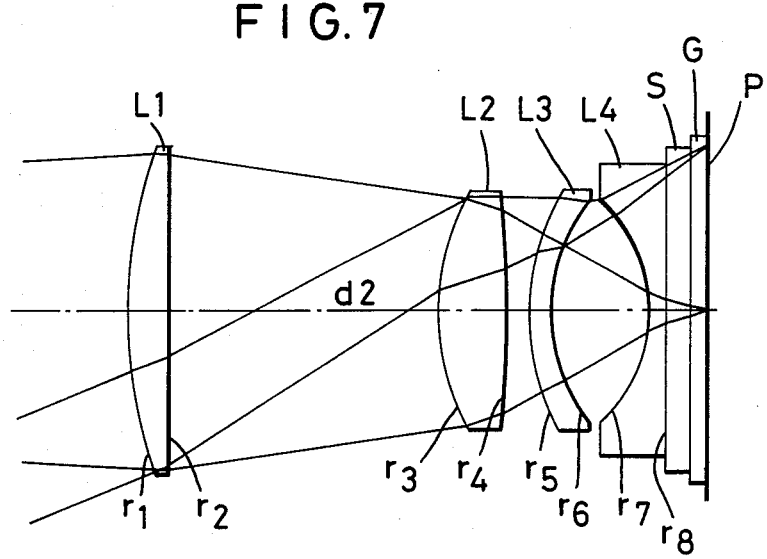
FIG. 7 shows the lens construction of a third embodiment of the present invention.

FIG. 7 shows the lens construction of the third embodiment of the present invention.

In the projection lens according to the third embodiment, a mirror inclined at 45° is inserted between the first lens $L_1$ and the second lens $L_2$ to bend the optical path and thereby enable the projection apparatus to be constructed compactly and therefore, the spacing $d_2$ between the first lens $L_1$ and the second lens $L_2$ is secured greatly.

The numerical data of the third embodiment are shown in Table 3 below.

TABLE 3

(Third Embodiment)

f = 152.5  Aperture ratio 1:1.03
Projection magnification −8.22  Half angle of view 23.7°

| | | | |
|---|---|---|---|
| *$r_1$ 174.189 | $d_1$ 20.0 | $n_1$ 1.49397 | $L_1$ |
| $r_2$ −52099.519 | $d_2$ 134.0 | | |
| $r_3$ 111.110 | $d_3$ 33.0 | $n_2$ 1.62041 | $L_2$ |
| $r_4$ −639.783 | $d_4$ 12.3 | | |
| $r_5$ 102.602 | $d_5$ 9.0 | $n_3$ 1.49397 | $L_3$ |
| *$r_6$ 89.160 | $d_6$ 50.4 | | |
| *$r_7$ −74.937 | $d_7$ 7.4 | $n_4$ 1.49397 | $L_4$ |
| $r_8$ ∞ | | | |
| $r_9$ ∞ | $d_8$ 12.0 | $n_5$ 1.41000 | S |
| $r_{10}$ ∞ | $d_9$ 7.0 | $n_6$ 1.51953 | G |

| | $r_1$ ($L_1$) | $r_6$ ($L_3$) | $r_7$ ($L_4$) |
|---|---|---|---|
| K | 1.0 | 1.0 | 0.0 |
| $C_2$ | 0.0 | 0.0 | 0.0 |
| $C_4$ | −0.3040 × $10^{-7}$ | 0.1683 × $10^{-6}$ | −0.8489 × $10^{-6}$ |
| $C_6$ | −0.7559 × $10^{-11}$ | 0.6758 × $10^{-10}$ | 0.1625 × $10^{-9}$ |
| $C_8$ | 0.1262 × $10^{-14}$ | −0.2936 × $10^{-13}$ | −0.6551 × $10^{-14}$ |
| $C_{10}$ | −0.9822 × $10^{-19}$ | 0.8893 × $10^{-17}$ | −0.8379 × $10^{-17}$ |

*Aspherical surfaces

Figure 8:
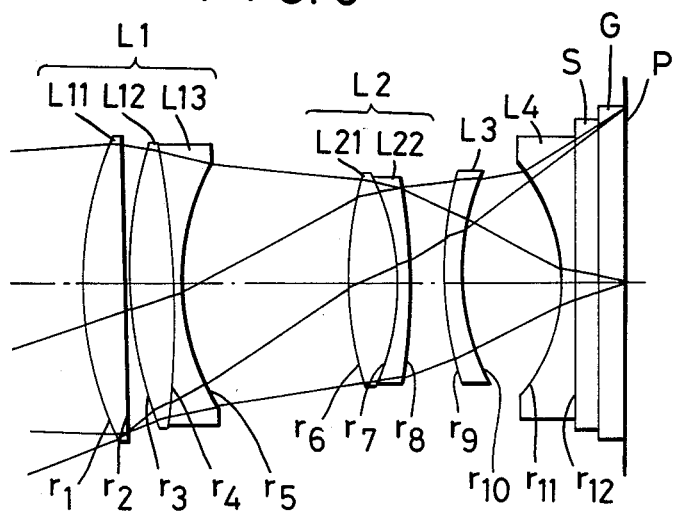
FIG. 8 shows the lens construction of a fourth embodiment of the present invention.

FIG. 8 shows the lens construction of the fourth embodiment of the present invention.

In the projection lens according to the fourth embodiment, the first lens $L_1$ is constituted by an achromatic cemented lens consisting of an aspherical lens $L_{11}$ made of acryl and lenses $L_{12}$ and $L_{13}$, and the second lens component $L_2$ is constituted by a cemented lens consisting of lenses $L_{21}$ and $L_{22}$, whereby on-axis chromatic aberration and chromatic difference of magnification are well corrected.

Accordingly, this projection lens can be sufficiently used even for so-called high vision in which the reduction in quality of image by the expanse of the spectral line of each CRT cannot be neglected.

Also, chromatic aberration is corrected substantially in the visible range and therefore, it is also possible to project by the use of a white single-tube CRT.

The numerical data of the fourth embodiment are shown below.

TABLE 4

(Fourth Embodiment)

f = 143.8  Aperture ratio 1:1.20
Projection magnification −10.57  Half angle of view 22.3°

| | | | | |
|---|---|---|---|---|
| *$r_1$ 120.700 | $d_1$ 16.25 | $n_1$ 1.49311 | $\nu_1$ 57.6 | $L_{11}$ |
| $r_2$ 2215.984 | $d_2$ 0.96 | | | |
| $r_3$ 144.213 | $d_3$ 20.08 | $n_2$ 1.62287 | $\nu_2$ 60.3 | $L_{12}$ |
| $r_4$ −400.000 | $d_4$ 5.74 | $n_3$ 1.62410 | $\nu_3$ 36.4 | $L_{13}$ |
| $r_5$ 108.300 | $d_5$ 70.6 | | | |
| $r_6$ 125.539 | $d_6$ 20.1 | $n_4$ 1.62287 | $\nu_4$ 60.3 | $L_{21}$ |
| $r_7$ −93.688 | $d_7$ 5.7 | $n_5$ 1.62410 | $\nu_5$ 36.4 | $L_{22}$ |
| $r_8$ −237.072 | $d_8$ 17.2 | | | |
| $r_9$ 168.004 | $d_9$ 8.1 | $n_6$ 1.49311 | $\nu_6$ 57.6 | $L_3$ |
| *$r_{10}$ 114.702 | $d_{10}$ 40.2 | | | |
| *$r_{11}$ −70.222 | $d_{11}$ 6.7 | $n_7$ 1.49311 | $\nu_7$ 57.6 | $L_4$ |
| $r_{12}$ ∞ | | | | |
| $r_{13}$ ∞ | $d_{12}$ 10.8 | $n_8$ 1.41000 | | S |
| $r_{14}$ ∞ | $d_{13}$ 9.7 | $n_9$ 1.51872 | | G |

| | $r_1$ ($L_1$) | $r_{10}$ ($L_3$) | $r_{17}$ ($L_4$) |
|---|---|---|---|
| K | 1.0 | 1.0 | 0.0 |
| $C_2$ | 0.0 | 0.0 | 0.0 |
| $C_4$ | −0.9227 × $10^{-7}$ | 0.5352 × $10^{-6}$ | 0.1401 × $10^{-6}$ |
| $C_6$ | −0.1847 × $10^{-11}$ | −0.3344 × $10^{-9}$ | −0.3942 × $10^{-9}$ |
| $C_8$ | −0.1525 × $10^{-14}$ | 0.2950 × $10^{-12}$ | 0.1706 × $10^{-12}$ |

TABLE 4-continued (Fourth Embodiment)

| f = 143.8 | | Aperture ratio 1:1.20 | |
| Projection magnification $-10.57$ | | Half angle of view 22.3° | |
| $C_{10}$ | $0.8643 \times 10^{-19}$ | $-0.6651 \times 10^{-16}$ | $-0.9423 \times 10^{-17}$ |

*Aspherical surfaces

Figure 9:
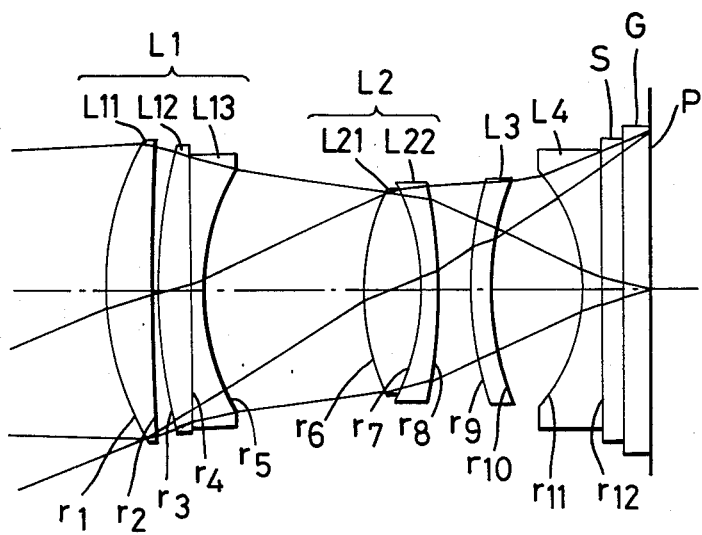
FIG. 9 shows the lens construction of a fifth embodiment of the present invention.

FIG. 9 shows the lens construction of the fifth embodiment of the present invention. In the projection lens according to the fifth embodiment, chromatic aberration is corrected by an arrangement similar to that of the fourth embodiment. Further, the first lens component $L_1$ is constituted by a glass lens $L_{11}$ of sufficiently strong refractive power and a plastic cemented lens of sufficiently weak composite refractive power, whereby the fluctuation of the image point position by temperature change is corrected to a practically negligible degree. In order that this plastic cemented lens may achieve a chromatization, acryl of low dispersion may be used for the positive lens $L_{12}$ and polycarbonate or polystyrene of high dispersion may be used for the negative lens $L_{13}$. Also, the surface $r_3$ of the cemented lens which is adjacent to the screen is made aspherical for the correction of spherical aberration.

The numerical data of the fifth embodiment are shown below.

TABLE 5

(Fifth Embodiment)

| f = 143.7 | | | Aperture ratio 1:1.20 | |
| Projection magnification $-10.57$ | | | Half angle of view 22.3° | |
| $r_1$ 113.095 | $d_1$ 20.0 | $n_1$ 1.62287 | $\nu_1$ 60.3 | $L_{11}$ |
| $r_2$ 797.471 | $d_2$ 0.9 | | | |
| *$r_3$ 167.032 | $d_3$ 16.0 | $n_2$ 1.49311 | $\nu_2$ 57.6 | $L_{12}$ |
| $r_4$ ∞ | $d_4$ 6.0 | $n_3$ 1.58975 | $\nu_3$ 30.3 | $L_{13}$ |
| $r_5$ 110.177 | $d_5$ 71.0 | | | |
| $r_6$ 121.636 | $d_6$ 22.0 | $n_4$ 1.62287 | $\nu_4$ 60.3 | $L_{21}$ |
| $r_7$ −93.688 | $d_7$ 5.0 | $n_5$ 1.62410 | $\nu_5$ 36.4 | $L_{22}$ |
| $r_8$ −280.383 | $d_8$ 17.0 | | | |
| $r_9$ 132.241 | $d_9$ 8.0 | $n_6$ 1.49311 | $\nu_6$ 57.6 | $L_3$ |
| *$r_{10}$ 109.869 | $d_{10}$ 40.1 | | | |
| *$r_{11}$ −67.597 | $d_{11}$ 7.0 | $n_7$ 1.49311 | $\nu_7$ 57.6 | $L_4$ |
| $r_{12}$ ∞ | | | | |
| $r_{13}$ ∞ | $d_{12}$ 9.0 | $n_8$ 1.41000 | | S |
| $r_{14}$ ∞ | $d_{13}$ 11.3 | $n_9$ 1.51872 | | G |

| | $r_3$ ($L_1$) | $r_{10}$ ($L_3$) | $r_{11}$ ($L_4$) |
| --- | --- | --- | --- |
| K | 1.0 | 1.0 | 0.0 |
| $C_2$ | 0.0 | 0.0 | 0.0 |
| $C_4$ | $-0.1274 \times 10^{-6}$ | $0.3193 \times 10^{-6}$ | $-0.4082 \times 10^{-8}$ |
| $C_6$ | $-0.6692 \times 10^{-11}$ | $-0.1445 \times 10^{-9}$ | $-0.5188 \times 10^{-9}$ |
| $C_8$ | $-0.6573 \times 10^{-15}$ | $0.8974 \times 10^{-13}$ | $0.2504 \times 10^{-12}$ |
| $C_{10}$ | $0.5935 \times 10^{-19}$ | $-0.2059 \times 10^{-16}$ | $-0.5752 \times 10^{-12}$ |

*Aspherical surfaces

Figure 10:
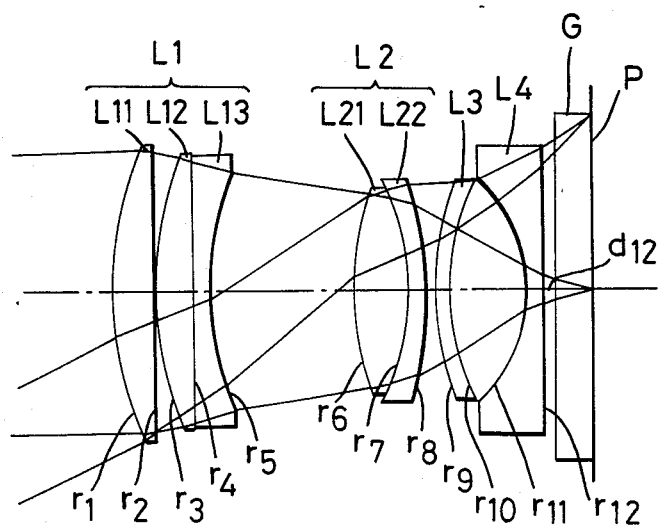
FIG. 10 shows the lens construction of a sixth embodiment of the present invention.

FIG. 10 shows the lens construction of the sixth embodiment of the present invention.

The projection lens according to the sixth embodiment is substantially similar in construction to that of the fifth embodiment, but in this projection lens, the fluctuation of the image point position resulting from temperature change is better corrected in addition to the correction of chromatic aberration.

Where it is necessary to vary the projection magnification greatly, the spacing $d_{12}$ between the fourth lens $L_4$ and the CRT face plate G may be made variable without being filled with silicon gel, as in the present embodiment.

The numerical data of the sixth embodiment are shown below.

TABLE 6

(Sixth Embodiment)

| f = 138.0 | | | Aperture ratio 1:1.16 | |
| Projection magnification $-30$ | | | Half angle of view 25.8° | |
| $r_1$ 132.347 | $d_1$ 17.0 | $n_1$ 1.51872 | $\nu_1$ 64.1 | $L_{11}$ |
| $r_2$ 1522.971 | $d_2$ 0.8 | | | |
| *$r_3$ 118.817 | $d_3$ 17.4 | $n_2$ 1.49311 | $\nu_2$ 57.6 | $L_{12}$ |
| $r_4$ ∞ | $d_4$ 5.4 | $n_3$ 1.58975 | $\nu_3$ 30.3 | $L_{13}$ |
| $r_5$ 129.631 | $d_5$ 64.7 | | | |
| $r_6$ 119.220 | $d_6$ 24.0 | $n_4$ 1.62287 | $\nu_4$ 60.3 | $L_{21}$ |
| $r_7$ −80.000 | $d_7$ 4.5 | $n_5$ 1.70444 | $\nu_5$ 30.1 | $L_{22}$ |
| $r_8$ −148.507 | $d_8$ 5.8 | | | |
| $r_9$ 125.766 | $d_9$ 5.6 | $n_6$ 1.49311 | $\nu_6$ 64.1 | $L_3$ |
| *$r_{10}$ 98.443 | $d_{10}$ 34.4 | | | |
| *$r_{11}$ −46.449 | $d_{11}$ 6.0 | $n_7$ 1.49311 | $\nu_7$ 64.1 | $L_4$ |
| $r_{12}$ ∞ | $d_{12}$ 4.4 | | | |
| $r_{13}$ ∞ | $d_{13}$ 16.0 | $n_8$ 1.51872 | | G |

| | $r_3$ ($L_1$) | $r_{10}$ ($L_3$) | $r_{11}$ ($L_4$) |
| --- | --- | --- | --- |
| K | 1.0 | 1.0 | 0.0 |
| $C_2$ | 0.0 | 0.0 | 0.0 |
| $C_4$ | $-0.1066 \times 10^{-6}$ | $0.3883 \times 10^{-6}$ | $0.1188 \times 10^{-5}$ |
| $C_6$ | $-0.2368 \times 10^{-10}$ | $-0.1374 \times 10^{-9}$ | $-0.2196 \times 10^{-9}$ |
| $C_8$ | $0.2100 \times 10^{-14}$ | $0.8384 \times 10^{-13}$ | $0.1082 \times 10^{-12}$ |
| $C_{10}$ | $-0.8124 \times 10^{-18}$ | $-0.1449 \times 10^{-16}$ | $-0.2688 \times 10^{-16}$ |

*Aspherical surfaces

With regard to the first to sixth embodiments of the present invention, the corresponding values of the aforementioned conditional formulas are given in Table 7 below.

TABLE 7

(Corresponding Values of Conditions)

| | Embodiments | | | | | |
| Conditions | 1 | 2 | 3 | 4 | 5 | 6 |
| --- | --- | --- | --- | --- | --- | --- |
| $\dfrac{r_B + r_A}{r_B - r_A}$ | −5.98 | −15.94 | −14.27 | −5.30 | −10.82 | −8.21 |
| $\dfrac{AS - S}{P_B}$ | 5.326 | 0.920 | 2.511 | 2.351 | 1.369 | 1.815 |
| $f_3/f$ | −11.3 | −15.0 | −11.6 | −5.37 | −10.39 | −7.15 |
| $d_6/d_4$ | 1.32 | 1.97 | 4.10 | 2.33 | 2.36 | 5.92 |
| $f_2/f$ | 1.07 | 1.08 | 1.02 | 0.94 | 0.97 | −0.84 |

In the projection lenses according to the seventh and eighth embodiment, the first lens component $L_1$ of positive refractive power is constituted by a first lens $L_{11}$ of glass having a strong positive refractive power, a positive lens $L_{12}$ of plastic and a negative lens $L_{13}$ also of plastic cemented thereto, and the second lens component $L_2$ of biconvex shape having a positive refractive power is constituted by a biconvex positive lens $L_{21}$ of glass and a negative meniscus lens $L_{22}$ of glass cemented thereto and having its convex surface facing the CRT side. On the CRT side of these, there are disposed a third lens component $L_3$ of meniscus shape having its concave surface facing the CRT side and having a very weak refractive power and a fourth lens component similar to that of the first to sixth embodiments.

The surface $r_3$ of the plastic positive lens $L_{12}$ in the first lens component $L_1$ which is adjacent to the screen, the surface $r_{10}$ of the third lens component $L_3$ which is adjacent to the CRT, and the surface $r_{11}$ of the fourth lens component $L_4$ which is adjacent to the screen are formed into aspherical surfaces.

Also, in the seventh and eighth embodiments, the flourescent surface P of the CRT corresponding to the object surface is formed into a concave surface which is concave toward the screen side, and thus curvature of image field is alleviated and therefore, this is a construction advantageous for aberration correction as a projection lens. That is, to accomplish chiefly the correction of distortion, it becomes possible to make the refractive power of the third lens component $L_3$ comprising a meniscus lens having its convex surface facing the screen side into a weak positive power and therefore, the positive refractive power of the second lens component $L_2$ can be slightly allotted to the third lens component $L_3$ as well, and in the third lens component $L_3$, coma can be corrected in addition to distortion. Accordingly, the projection lens can be made brighter and the quantity of marginal light can be maintained greater.

As shown in the tables of numerical data below, in the seventh and eighth embodiments, the first lens $L_{11}$ having a strong refractive power is made of glass and the cemented lens consisting of a positive lens $L_{12}$ and a negative lens $L_{13}$ cemented together and having a weak composite refractive power is made of plastic, whereby it is possible to correct the fluctuation of the image point position by temperature change to a practically negligible degree. To accomplish achromatization well in the cemented lens, acryl of low dispersion is used for the positive lens $L_{12}$ and styrene of high dispersion is used for the negative lens $L_{13}$.

TABLE 8

(Seventh Embodiment)

$f = 127.0$ Aperture ratio 1:1.08
Projection magnification −9.8 Half angle of view 25°

| | | | | |
|---|---|---|---|---|
| $r_1$ 96.536 | $d_1$ 24.0 | $n_1$ 1.62287 | $\nu_1$ 60.3 | $L_{11}$ |
| $r_2$ 1102.910 | $d_2$ 0.2 | | | |
| *$r_3$ 131.939 | $d_3$ 15.0 | $n_2$ 1.49311 | $\nu_2$ 57.6 | $L_{12}$ |
| $r_4$ −1585.090 | $d_4$ 4.0 | $n_3$ 1.59628 | $\nu_3$ 31.0 | $L_{13}$ |
| $r_5$ 100.889 | $d_5$ 54.0 | | | |
| $r_6$ 133.523 | $d_6$ 26.0 | $n_4$ 1.62287 | $\nu_4$ 60.3 | $L_{21}$ |
| $r_7$ −88.709 | $d_7$ 4.5 | $n_5$ 1.62410 | $\nu_5$ 36.4 | $L_{22}$ |
| $r_8$ −238.479 | $d_8$ 6.0 | | | |
| $r_9$ 263.992 | $d_9$ 7.0 | $n_6$ 1.49311 | $\nu_6$ 57.6 | $L_3$ |
| *$r_{10}$ 265.569 | $d_{10}$ 33.0 | | | |
| *$r_{11}$ −55.918 | $d_{11}$ 6.0 | $n_7$ 1.49311 | $\nu_7$ 57.6 | $L_4$ |
| $r_{12}$ ∞ | | | | |
| $r_{13}$ ∞ | $d_{12}$ 5.9 | $n_8$ 1.41000 | | S |
| $r_{14}$ ∞ | $d_{13}$ 15.0 | $n_9$ 1.51872 | | G |
| $r_{15}$ −2350.000 | | | | |

| | $r_3$ ($L_1$) | $r_{10}$ ($L_3$) | $r_{11}$ ($L_4$) |
|---|---|---|---|
| K | 1.0 | 1.0 | 0.0 |
| $C_2$ | 0.0 | 0.0 | 0.0 |
| $C_4$ | $-2.02266 \times 10^{-7}$ | $2.75937 \times 10^{-7}$ | $-5.60733 \times 10^{-7}$ |
| $C_6$ | $-9.38012 \times 10^{-12}$ | $-2.66816 \times 10^{-10}$ | $-4.11311 \times 10^{-11}$ |
| $C_8$ | $-6.99352 \times 10^{-15}$ | $1.25977 \times 10^{-13}$ | $6.21774 \times 10^{-14}$ |
| $C_{10}$ | $1.02149 \times 10^{-18}$ | $-3.00237 \times 10^{-17}$ | $-2.03224 \times 10^{-17}$ |

*Aspherical surfaces

TABLE 9

(Eighth Embodiment)

$f = 126.9$ Aperture ratio 1:1.08
Projection magnification −9.8 Half angle of view 25°

| | | | | |
|---|---|---|---|---|
| $r_1$ 97.921 | $d_1$ 24.0 | $n_1$ 1.62287 | $\nu_1$ 60.3 | $L_{11}$ |
| $r_2$ 1108.160 | $d_2$ 0.2 | | | |
| *$r_3$ 135.649 | $d_3$ 15.0 | $n_2$ 1.49311 | $\nu_2$ 57.6 | $L_{12}$ |
| $r_4$ −1474.680 | $d_4$ 4.0 | $n_3$ 1.59628 | $\nu_3$ 31.0 | $L_{13}$ |
| $r_5$ 108.117 | $d_5$ 54.0 | | | |
| $r_6$ 139.705 | $d_6$ 26.0 | $n_4$ 1.62287 | $\nu_4$ 60.3 | $L_{21}$ |
| $r_7$ −113.316 | $d_7$ 4.5 | $n_5$ 1.65285 | $\nu_5$ 33.8 | $L_{22}$ |
| $r_8$ −258.459 | $d_8$ 6.0 | | | |
| $r_9$ 229.964 | $d_9$ 7.0 | $n_6$ 1.49311 | $\nu_6$ 57.6 | $L_3$ |
| *$r_{10}$ 299.996 | $d_{10}$ 33.0 | | | |
| *$r_{11}$ −55.364 | $d_{11}$ 6.0 | $n_7$ 1.49311 | $\nu_7$ 57.6 | $L_4$ |
| $r_{12}$ ∞ | | | | |
| $r_{13}$ ∞ | $d_{12}$ 5.8 | $n_8$ 1.41000 | | S |
| $r_{14}$ ∞ | $d_{13}$ 15.0 | $n_9$ 1.51872 | | G |

TABLE 9-continued (Eighth Embodiment)

$f = 126.9$ Aperture ratio 1:1.08
Projection magnification −9.8 Half angle of view 25°

$r_{15}$ −2350.000

| | $r_3$ ($L_1$) | $r_{10}$ ($L_3$) | $r_{11}$ ($L_4$) |
|---|---|---|---|
| K | 1.0 | 1.0 | 0.0 |
| $C_2$ | 0.0 | 0.0 | 0.0 |
| $C_4$ | $-1.91619 \times 10^{-7}$ | $2.33150 \times 10^{-7}$ | $-7.07972 \times 10^{-7}$ |
| $C_6$ | $-6.66213 \times 10^{-12}$ | $-3.25427 \times 10^{-10}$ | $-8.67162 \times 10^{-11}$ |
| $C_8$ | $-7.09157 \times 10^{-15}$ | $1.47427 \times 10^{-13}$ | $9.00252 \times 10^{-14}$ |
| $C_{10}$ | $1.02134 \times 10^{-18}$ | $-3.56388 \times 10^{-17}$ | $-2.49813 \times 10^{-17}$ |

*Aspherical surfaces

With regard to the seventh and eighth embodiments of the present invention, the corresponding values of the aforementioned conditional formulas are given in the table below.

TABLE 10

(Corresponding Values of Conditions)

| | Embodiments | |
|---|---|---|
| Conditions | 7 | 8 |
| $\dfrac{r_B - r_A}{r_B + r_A}$ | 0.003 | 0.132 |
| $\dfrac{AS - S}{P_B}$ | −0.639 | −4.324 |
| $f/f_3$ | 0.0035 | 0.0656 |
| $d_6/d_4$ | 5.5 | 5.5 |
| $f_2/f$ | 1.12 | 1.207 |

As described above, according to the present invention, there is achieved a projection lens for a video projector having brightness of aperture ratio 1:1.03 to 1:1.2 and having a wide angle of view, e.g. a half angle of view of 22°–28° and yet having an excellent imaging performance and moreover having various aberrations corrected well. Due to the wide angle of view, the projection apparatus can be constructed compactly, and in spite of the wide angle of view, the high-order bending of distortion is corrected well and therefore, where a three-tube type projection apparatus is to be provided, the variation in magnification by the effect of swing and tilting can be easily corrected by a change in the scanning magnification of the CRT and therefore, the images by three B, G, R tubes can be accurately superposed upon one another even in the marginal portion, whereby a clear-out color projected image free of blur in color can be obtained.

We claim:

1. A projection lens for projecting an image onto a screen, including in succession from said screen side;

a first lens component having a positive refractive power;

a second lens component having a positive refractive power and whose both lens surfaces are convex surfaces;

a third lens component of meniscus shape having its convex surface facing the screen side; and a fourth lens component having a negative refractive power and whose surface facing the screen is a concave surface;

wherein the projection lens satisfies the following condition:

$$-20 < \frac{r_B + r_A}{r_B - r_A} < -1,$$

where $r_A$ is the radius of curvature of that surface of said third lens component which is nearest said screen, and $r_B$ is the radius of curvature of that surface of said third lens component which is nearest the object side.

2. A projection lens according to claim 1, wherein that surface of said third lens component which is adjacent to the object side is an aspherical surface, and the shape of said aspherical surface satisfies the following condition:

$$0 < \frac{AS - S}{P_B} < 10,$$

where
AS-S: the difference in the direction of the optic axis between the aspherical surface in the outermost marginal portion of the effective diameter and the reference spherical surface having a predetermined vertical radius of curvature
$P_B$: the vertical refractive power of said aspherical surface normalized by the focal length of the entire system
that is, $$P_B = \frac{n-1}{r_B} \times f,$$

where
n: the refractive index of the third lens component
f: the focal length of the entire system.

3. A projection lens according to claim 2, which satisfies the following conditions:

$$-20 < f_3/f < -2.0$$

$$1.0 < D_6/D_4 < 6.0$$

where $f_3$ is the focal length of said third lens component, $D_4$ is the spacing on the optic axis between said second lens component and said third lens component, and $D_6$ is the spacing on the optic axis between said third lens component and said fourth lens component.

4. A projection lens according to claim 3, which satisfies the following condition:

$$0.8 < f_2/f < 1.1,$$

where $f_2$ is the focal length of said second lens component.

5. A projection lens according to claim 1, wherein said third lens component has a negative refractive power.

6. A projection lens according to claim 5, wherein the numerical data are as follows:

| f = 106.5 Projection magnification −7.95 | | Aperture ratio 1:10 Half angle of view 27.9° | |
|---|---|---|---|
| *r₁ 108.818 | d₁ 13.0 | n₁ 1.49397 | L₁ |
| r₂ 707.141 | d₂ 58.0 | | |
| r₃ 116.671 | d₃ 20.0 | n₂ 1.62041 | L₂ |
| r₄ −166.300 | d₄ 23.0 | | |
| r₅ 231.147 | d₅ 6.5 | n₃ 1.49397 | L₃ |
| *r₆ 164.907 | d₆ 30.37 | | |

-continued

| f = 106.5 Projection magnification −7.95 | | Aperture ratio 1:10 Half angle of view 27.9° | |
|---|---|---|---|
| *r₇ −47.143 | d₇ 5.0 | n₄ 1.49397 | L₄ |
| r₈ ∞ | | | |
| r₉ ∞ | d₈ 16.0 | n₅ 1.41000 | S |
| r₁₀ ∞ | d₉ 7.0 | n₆ 1.51953 | G |

*Aspherical surfaces where $r_1, r_2, r_3, \ldots$ represent the radii of curvature of the surfaces of the successive lenses from the screen side, $d_1, d_2, d_3, \ldots$ represent the center thicknesses and spacings of the respective lenses, $n_1, n_2, n_3, \ldots$ represent the refractive indices of the respective lenses for e-line ($\lambda = 546.1$ nm).

7. A projection lens according to claim 5, wherein the numerical data are as follows:

| f = 149.4 Projection magnification −10.65 | | Aperture ratio 1:1.20 Half angle of view 22.5° | |
|---|---|---|---|
| *r₁ 147.614 | d₁ 17.5 | n₁ 1.49311 | L₁ |
| r₂ 1238.391 | d₂ 100.0 | | |
| r₃ 139.320 | d₃ 24.0 | n₂ 1.62287 | L₂₁ |
| r₄ −139.320 | d₄ 6.0 | n₃ 1.62410 | L₂₂ |
| r₅ −331.819 | d₅ 22.3 | | |
| r₆ 116.134 | d₆ 9.0 | n₄ 1.49311 | L₃ |
| *r₇ 102.423 | d₇ 44.0 | | |
| *r₈ −64.983 | d₈ 7.0 | n₅ 1.49311 | L₄ |
| r₉ ∞ | | | |
| r₁₀ ∞ | d₉ 15.0 | n₆ 1.41000 | L₅ |
| r₁₁ ∞ | d₁₀ 7.1 | n₇ 1.51872 | L₆ |

*Aspherical surfaces where $r_1, r_2, r_3, \ldots$ represent the radii of curvature of the surfaces of the successive lenses from the screen side, $d_1, d_2, d_3, \ldots$ represent the center thicknesses and spacings of the respective lenses, $n_1, n_2, n_3, \ldots$ represent the refractive indices of the respective lenses for e-line ($\lambda = 546.1$ nm).

8. A projection lens according to claim 5, wherein the numerical data are as follows:

| f = 152.5 Projection magnification −8.22 | | Aperture ratio 1:1.03 Half angle of view 23.7° | |
|---|---|---|---|
| *r₁ 174.189 | d₁ 20.0 | n₁ 1.49397 | L₁ |
| r₂ −52099.519 | d₂ 134.0 | | |
| r₃ 111.110 | d₃ 33.0 | n₂ 1.62041 | L₂ |
| r₄ −639.783 | d₄ 12.3 | | |
| r₅ 102.602 | d₅ 9.0 | n₃ 1.49397 | L₃ |
| *r₆ 89.160 | d₆ 50.4 | | |
| *r₇ −74.937 | d₇ 7.4 | n₄ 1.49397 | L₄ |
| r₈ ∞ | | | |
| r₉ ∞ | d₈ 12.0 | n₅ 1.41000 | S |
| r₁₀ ∞ | d₉ 7.0 | n₆ 1.51953 | G |

*Aspherical surfaces where $r_1, r_2, r_3, \ldots$ represent the radii of curvature of the surfaces of the successive lenses from the screen side, $d_1, d_2, d_3, \ldots$ represent the center thicknesses and spacings of the respective lenses, $n_1, n_2, n_3, \ldots$ represent the refractive indices of the respective lenses for e-line ($\lambda = 546.1$ nm).

9. A projection lens according to claim 5, wherein the numerical data are as follows:

| f = 143.8 Projection magnification −10.57 | | Aperture ratio 1:1.20 Half angle of view 22.3° | |
|---|---|---|---|
| *r₁ 120.700 | d₁ 16.25 | n₁ 1.49311 | ν₁ 57.6 | L₁₁ |
| r₂ 2215.984 | d₂ 0.96 | | | |
| r₃ 144.213 | d₃ 20.08 | n₂ 1.62287 | ν₂ 60.3 | L₁₂ |

-continued

| f = 143.8 | | Aperture ratio 1:1.20 | | |
|---|---|---|---|---|
| Projection magnification −10.57 | | Half angle of view 22.3° | | |
| $r_4$ −400.000 | $d_4$ 5.74 | $n_3$ 1.62410 | $\nu_3$ 36.4 | $L_{13}$ |
| $r_5$ 108.300 | $d_5$ 70.6 | | | |
| $r_6$ 125.539 | $d_6$ 20.1 | $n_4$ 1.62287 | $\nu_4$ 60.3 | $L_{21}$ |
| $r_7$ −93.688 | $d_7$ 5.7 | $n_5$ 1.62410 | $\nu_5$ 36.4 | $L_{22}$ |
| $r_8$ −237.072 | $d_8$ 17.2 | | | |
| $r_9$ 168.004 | $d_9$ 8.1 | $n_6$ 1.49311 | $\nu_6$ 57.6 | $L_3$ |
| *$r_{10}$ 114.702 | $d_{10}$ 40.2 | | | |
| *$r_{11}$ −70.222 | $d_{11}$ 6.7 | $n_7$ 1.49311 | $\nu_7$ 57.6 | $L_4$ |
| $r_{12}$ ∞ | | | | |
| $r_{13}$ ∞ | $d_{12}$ 10.8 | $n_8$ 1.41000 | | S |
| $r_{14}$ ∞ | $d_{13}$ 9.7 | $n_9$ 1.51872 | | G |

*Aspherical surfaces where $r_1, r_2, r_3, \ldots$ represent the radii of curvature of the surfaces of the successive lenses from the screen side, $d_1, d_2, d_3, \ldots$ represent the center thicknesses and spacings of the respective lenses, $n_1, n_2, n_3, \ldots$ represent the refractive indices of the respective lenses for e-line ($\lambda=546.1$ nm), and $\nu_1, \nu_2, \nu_3, \ldots$ represent the Abbe numbers of the respective lenses.

10. A projection lens according to claim 5, wherein the numerical data are as follows:

| f = 143.7 | | Aperture ratio 1:1.20 | | |
|---|---|---|---|---|
| Projection magnification −10.57 | | Half angle of view 22.3° | | |
| $r_1$ 113.095 | $d_1$ 20.0 | $n_1$ 1.62287 | $\nu_1$ 60.3 | $L_{11}$ |
| $r_2$ 797.471 | $d_2$ 0.9 | | | |
| *$r_3$ 167.032 | $d_3$ 16.0 | $n_2$ 1.49311 | $\nu_2$ 57.6 | $L_{12}$ |
| $r_4$ ∞ | $d_4$ 6.0 | $n_3$ 1.58975 | $\nu_3$ 30.3 | $L_{13}$ |
| $r_5$ 110.177 | $d_5$ 71.0 | | | |
| $r_6$ 121.636 | $d_6$ 22.0 | $n_4$ 1.62287 | $\nu_4$ 60.3 | $L_{21}$ |
| $r_7$ −93.688 | $d_7$ 5.0 | $n_5$ 1.62410 | $\nu_5$ 36.4 | $L_{22}$ |
| $r_8$ −280.383 | $d_8$ 17.0 | | | |
| $r_9$ 132.241 | $d_9$ 8.0 | $n_6$ 1.49311 | $\nu_6$ 57.6 | $L_3$ |
| *$r_{10}$ 109.869 | $d_{10}$ 40.1 | | | |
| *$r_{11}$ −67.597 | $d_{11}$ 7.0 | $n_7$ 1.49311 | $\nu_7$ 57.6 | $L_4$ |
| $r_{12}$ ∞ | | | | |
| $r_{13}$ ∞ | $d_{12}$ 9.0 | $n_8$ 1.41000 | | S |
| $r_{14}$ ∞ | $d_{13}$ 11.3 | $n_9$ 1.51872 | | G |

*Aspherical surfaces where $r_1, r_2, r_3, \ldots$ represent the radii of curvature of the surfaces of the successive lenses from the screen side, $d_1, d_2, d_3, \ldots$ represent the center thicknesses and spacings of the respective lenses, $n_1, n_2, n_3, \ldots$ represent the refractive indices of the respective lenses for e-line ($\lambda=546.1$ nm), and $\nu_1, \nu_2, \nu_3, \ldots$ represent the Abbe numbers of the respective lenses.

11. A projection lens according to claim 5, wherein the numerical data are as follows:

| f = 138.0 | | Aperture ratio 1:1.16 | | |
|---|---|---|---|---|
| Projection magnification −30 | | Half angle of view 25.8° | | |
| $r_1$ 132.347 | $d_1$ 17.0 | $n_1$ 1.51872 | $\nu_1$ 64.1 | $L_{11}$ |
| $r_2$ 1522.971 | $d_2$ 0.8 | | | |
| *$r_3$ 118.817 | $d_3$ 17.4 | $n_2$ 1.49311 | $\nu_2$ 57.6 | $L_{12}$ |
| $r_4$ ∞ | $d_4$ 5.4 | $n_3$ 1.58975 | $\nu_3$ 30.3 | $L_{13}$ |
| $r_5$ 129.631 | $d_5$ 64.7 | | | |
| $r_6$ 119.220 | $d_6$ 24.0 | $n_4$ 1.62287 | $\nu_4$ 60.3 | $L_{21}$ |
| $r_7$ −80.000 | $d_7$ 4.5 | $n_5$ 1.70444 | $\nu_5$ 30.1 | $L_{22}$ |
| $r_8$ −148.507 | $d_8$ 5.8 | | | |
| $r_9$ 125.766 | $d_9$ 5.6 | $n_6$ 1.49311 | $\nu_6$ 64.1 | $L_3$ |
| *$r_{10}$ 98.443 | $d_{10}$ 34.4 | | | |
| *$r_{11}$ −46.449 | $d_{11}$ 6.0 | $n_7$ 1.49311 | $\nu_7$ 64.1 | $L_4$ |
| $r_{12}$ ∞ | $d_{12}$ 4.4 | | | |
| $r_{13}$ ∞ | $d_{13}$ 16.0 | $n_8$ 1.51872 | | G |

*Aspherical surfaces where $r_1, r_2, r_3, \ldots$ represent the radii of curvature of the surfaces of the successive lenses from the screen side, $d_1, d_2, d_3, \ldots$ represent the center thicknesses and spacings of the respective lenses, $n_1, n_2, n_3, \ldots$ represent the refractive indices of the respective lenses for e-line ($\lambda=546.1$ nm), and $\nu_1, \nu_2, \nu_3, \ldots$ represent the Abbe numbers of the respective lenses.

12. A projection lens for projecting an image onto a screen, including in succession from said screen side:
   a first lens component having a positive refractive power;
   a second lens component having a positive refractive power and whose both lens surfaces are convex surfaces;
   a third lens component of meniscus shape having its convex surface facing the screen side; and
   a fourth lens component having a negative refractive power and whose surface facing the screen is a concave surface;
   wherein the projection lens satisfies the following condition:

$$-0.05 < \frac{r_B - r_A}{r_B + r_A} < 1,$$

where $r_A$ is the radius of curvature of that surface of said third lens component which is nearest said screen, and $r_B$ is the radius of curvature of that surface of said third lens component which is nearest the object side;
wherein said third lens component has a positive refractive power and that surface of said third lens component which is adjacent to the object side is an aspherical surface, and the shape of said aspherical surface satisfies the following condition:

$$-10 < \frac{AS - S}{P_B} < 1,$$

where
AS−S: the difference in the direction of the optic axis between the aspherical surface in the outermost marginal portion of the effective diameter and the reference spherical surface having a predetermined vertical radius of curvature
$P_B$: the vertical refractive power of said aspherical surface normalized by the focal length of the entire system
that is, $$P_B = \frac{n-1}{r_B} \times f$$

where
n: the refractive index of the third lens component
f: the focal length of the entire system;
and wherein said projection lens also satisfies the following conditions:

$$-0.05 < f/f_3 < 0.03$$

$$1.0 < D_6/D_4 < 6.0$$

$$0.9 < f_2/f < 1.3$$

where $f_3$ is the focal length of said third lens component, $D_4$ is the spacing on the optic axis between said second lens component and said third lens component, $D_6$ is the spacing on the optic axis between said third lens component and said fourth lens component, and where $f_2$ is the focal length of said second lens component.

13. A projection lens according to claim 12, wherein the numerical data are as follows:

| $f = 126.9$ | | Aperture ratio 1:1.08 | | |
| Projection magnification −9.8 | | Half angle of view 25° | | |
| --- | --- | --- | --- | --- |
| $r_1$ 97.921 | $d_1$ 24.0 | $n_1$ 1.62287 | $\nu_1$ 60.3 | $L_{11}$ |
| $r_2$ 1108.160 | $d_2$ 0.2 | | | |
| *$r_3$ 135.649 | $d_3$ 15.0 | $n_2$ 1.49311 | $\nu_2$ 57.6 | $L_{12}$ |
| $r_4$ −1474.680 | $d_4$ 4.0 | $n_3$ 1.59628 | $\nu_3$ 31.0 | $L_{13}$ |
| $r_5$ 108.117 | $d_5$ 54.0 | | | |
| $r_6$ 139.705 | $d_6$ 26.0 | $n_4$ 1.62287 | $\nu_4$ 60.3 | $L_{21}$ |
| $r_7$ −113.316 | $d_7$ 4.5 | $n_5$ 1.65285 | $\nu_5$ 33.8 | $L_{22}$ |
| $r_8$ −258.459 | $d_8$ 6.0 | | | |
| $r_9$ 229.964 | $d_9$ 7.0 | $n_6$ 1.49311 | $\nu_6$ 57.6 | $L_3$ |
| *$r_{10}$ 299.996 | $d_{10}$ 33.0 | | | |
| *$r_{11}$ −55.364 | $d_{11}$ 6.0 | $n_7$ 1.49311 | $\nu_7$ 57.6 | $L_4$ |
| $r_{12}$ ∞ | | | | |
| $r_{13}$ ∞ | $d_{12}$ 5.8 | $n_8$ 1.41000 | | S |
| $r_{14}$ ∞ | $d_{13}$ 15.0 | $n_9$ 1.51872 | | G |
| $r_{15}$ −2350.000 | | | | |

*Aspherical surfaces where $r_1, r_2, r_3, \ldots$ represent the radii of curvature of the surfaces of the successive lenses from the screen side, $d_1, d_2, d_3, \ldots$ represent the center thicknesses and spacings of the respective lenses, $n_1, n_2, n_3, \ldots$ represent the refractive indices of the respective lenses for e-line ($\lambda = 546.1$ nm), and $\nu_1, \nu_2, \nu_3, \ldots$ represent the Abbe numbers of the respective lenses.

14. A projection lens according to claim 12, wherein said first lens component includes in succession from said screen side a first lens element of a positive refractive power, a second lens element of a positive refractive power and a third lens element of a negative refractive power, and wherein said first lens element is made of glass, and said second and third lens elements are made of plastic.

15. A projection lens according to claim 12, wherein said second lens element is cemented to said third lens element.

16. A projection lens according to claim 15, wherein said second lens component includes in succession from the screen side a fourth lens element of a positive refractive power and a fifth lens element of a negative refractive power, and wherein said fourth lens element is cemented to said fifth lens element.

17. A projection lens according to claim 16, wherein the numerical data are as follows:

| $f = 127.0$ | | Aperture ratio 1:1.08 | | |
| Projection magnification −9.8 | | Half angle of view 25° | | |
| --- | --- | --- | --- | --- |
| $r_1$ 96.536 | $d_1$ 24.0 | $n_1$ 1.62287 | $\nu_1$ 60.3 | $L_{11}$ |
| $r_2$ 1102.910 | $d_2$ 0.2 | | | |
| *$r_3$ 131.939 | $d_3$ 15.0 | $n_2$ 1.49311 | $\nu_2$ 57.6 | $L_{12}$ |
| $r_4$ −1585.090 | $d_4$ 4.0 | $n_3$ 1.59628 | $\nu_3$ 31.0 | $L_{13}$ |
| $r_5$ 100.889 | $d_5$ 54.0 | | | |
| $r_6$ 133.523 | $d_6$ 26.0 | $n_4$ 1.62287 | $\nu_4$ 60.3 | $L_{21}$ |
| $r_7$ −88.709 | $d_7$ 4.5 | $n_5$ 1.62410 | $\nu_5$ 36.4 | $L_{22}$ |
| $r_8$ −238.479 | $d_8$ 6.0 | | | |
| $r_9$ 263.992 | $d_9$ 7.0 | $n_6$ 1.49311 | $\nu_6$ 57.6 | $L_3$ |
| *$r_{10}$ 265.569 | $d_{10}$ 33.0 | | | |
| *$r_{11}$ −55.918 | $d_{11}$ 6.0 | $n_7$ 1.49311 | $\nu_7$ 57.6 | $L_4$ |
| $r_{12}$ ∞ | | | | |
| $r_{13}$ ∞ | $d_{12}$ 5.9 | $n_8$ 1.41000 | | S |
| $r_{14}$ ∞ | $d_{13}$ 15.0 | $n_9$ 1.51872 | | G |
| $r_{15}$ −2350.000 | | | | |

*Aspherical surfaces where $r_1, r_2, r_3, \ldots$ represent the radii of curvature of the surfaces of the successive lenses from the screen side, $d_1, d_2, d_3, \ldots$ represent the center thicknesses and spacings of the respective lenses, $n_1, n_2, n_3, \ldots$ represent the refractive indices of the respective lenses for e-line ($\lambda = 546.1$ nm), and $\nu_1, \nu_2, \nu_3, \ldots$ represent the Abbe numbers of the respective lenses.

* * * * *